United States Patent
Kim et al.

(10) Patent No.: US 10,742,803 B2
(45) Date of Patent: Aug. 11, 2020

(54) APPARATUS AND METHOD FOR RECORDING CELLULAR CALL IN AN INTERNET TELEPHONE SYSTEM

(71) Applicant: Samsung Electronics Co., Ltd., Gyeonggi-do (KR)

(72) Inventors: Yo-Sun Kim, Seoul (KR); Joong-Seok Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 12 days.

(21) Appl. No.: 15/958,835

(22) Filed: Apr. 20, 2018

(65) Prior Publication Data

US 2018/0241875 A1 Aug. 23, 2018

Related U.S. Application Data

(63) Continuation of application No. 12/647,137, filed on Dec. 24, 2009, now abandoned.

(30) Foreign Application Priority Data

Dec. 24, 2008 (KR) .................. 10-2008-0133062

(51) Int. Cl.
*H04M 3/42* (2006.01)
*H04W 4/12* (2009.01)
*H04L 29/06* (2006.01)

(52) U.S. Cl.
CPC ..... *H04M 3/42221* (2013.01); *H04L 65/1083* (2013.01); *H04M 2207/20* (2013.01); *H04W 4/12* (2013.01)

(58) Field of Classification Search
CPC .......... H04L 65/1083; H04M 2207/20; H04M 3/42221; H04W 4/12
See application file for complete search history.

(56) References Cited

U.S. PATENT DOCUMENTS 6,335,927 B1 * 1/2002 Elliott .................... H04L 12/14
370/352
6,795,534 B2 * 9/2004 Noguchi ........... H04M 3/42221
370/252

(Continued)

FOREIGN PATENT DOCUMENTS

KR 1020060102404 9/2006

OTHER PUBLICATIONS

Korean Notice of Patent Grant dated Nov. 20, 2014 issued in counterpart application No. 10-2008-0133062.

(Continued)

*Primary Examiner* — Khaled M Kassim
(74) *Attorney, Agent, or Firm* — The Farrell Law Firm, P.C.

(57) ABSTRACT

Call recording in an Internet telephone system is provided. A dual-mode terminal includes a call server interworker for, when a cellular call commences, determining whether it is possible to access a call server which controls Voice over Internet Protocol (VoIP) calls; a recording interface processor for, when it is possible to access the call server, setting a connection to a recording server; a recorder for generating recording data packets comprising a cellular phone conversation; and a data communicator for transmitting the recording data packets to the recording server.

12 Claims, 6 Drawing Sheets

(56) References Cited

U.S. PATENT DOCUMENTS

| | | | |
|---|---|---|---|
| 2004/0207724 A1* | 10/2004 | Crouch | H04M 3/42221 348/14.09 |
| 2005/0094626 A1* | 5/2005 | Yoshihara | H04L 12/2801 370/352 |
| 2005/0249196 A1* | 11/2005 | Ansari | H04L 12/2803 370/352 |
| 2006/0105766 A1* | 5/2006 | Azada | H04W 48/18 455/432.1 |
| 2006/0233321 A1* | 10/2006 | Barker | H04M 3/42221 379/67.1 |
| 2006/0287002 A1* | 12/2006 | Sun | H04M 1/656 455/556.1 |
| 2007/0015535 A1* | 1/2007 | LaBauve | H04L 29/06027 455/552.1 |
| 2007/0015536 A1* | 1/2007 | LaBauve | H04L 29/06027 455/552.1 |
| 2007/0047693 A1* | 3/2007 | Bouchard | H04M 3/2281 379/67.1 |
| 2007/0091848 A1 | 4/2007 | Karia et al. | |
| 2007/0118660 A1* | 5/2007 | Garcia-Martin | H04L 43/00 709/227 |
| 2007/0153771 A1 | 7/2007 | Doradla | |
| 2007/0153986 A1* | 7/2007 | Bloebaum | H04M 7/0057 379/45 |
| 2007/0171894 A1* | 7/2007 | Han | H04W 88/06 370/352 |
| 2007/0211876 A1* | 9/2007 | Othmer | H04M 1/656 379/201.01 |
| 2007/0263605 A1* | 11/2007 | Estevez | H04L 12/5692 370/356 |
| 2007/0263785 A1* | 11/2007 | Williams | H04M 3/42221 379/67.1 |
| 2008/0170561 A1* | 7/2008 | Halbraich | H04L 63/00 370/352 |
| 2008/0186953 A1* | 8/2008 | Buckley | H04Q 11/0457 370/352 |
| 2008/0220813 A1* | 9/2008 | Brown | H04L 12/5692 455/552.1 |
| 2009/0022103 A1* | 1/2009 | Shatsky | H04W 36/0022 370/331 |
| 2009/0052637 A1* | 2/2009 | Kao | H04M 3/533 379/88.17 |
| 2009/0097450 A1* | 4/2009 | Wallis | H04W 36/0022 370/331 |
| 2009/0129293 A1* | 5/2009 | den Hartog | H04M 3/42221 370/259 |
| 2009/0131045 A1* | 5/2009 | Feuer | H04W 76/10 455/426.1 |
| 2009/0307312 A1* | 12/2009 | Ramaswamy | H04M 3/42221 709/205 |
| 2012/0164986 A1* | 6/2012 | Rangroo | H04M 3/42221 455/412.1 |

OTHER PUBLICATIONS

U.S. Decision on Appeal dated Sep. 10, 2018 issued in counterpart U.S. Appl. No. 12/647,137, 11 pages.

\* cited by examiner

APPARATUS AND METHOD FOR RECORDING CELLULAR CALL IN AN INTERNET TELEPHONE SYSTEM

PRIORITY

The present application is a continuation application of U.S. patent application Ser. No. 12/647,137, which was filed on Dec. 24, 2009 and claims priority under 35 U.S.C. § 119(a) to an application filed in the Korean Intellectual Property Office on Dec. 24, 2008 and assigned Serial No. 10-2008-0133062, the entire disclosure of each of these application is hereby incorporated by reference.

BACKGROUND OF THE INVENTION

1. Field of the Invention

The present invention relates generally to an Internet telephone system. More particularly, the present invention relates to an apparatus and method for recording a cellular call of a dual-mode terminal which supports an Internet call and cellular call in the Internet telephone system.

2. Description of the Related Art

An the Internet call provides for voice conversation using a Voice over Internet Protocol (VoIP) technique which offers the voice call over an IP network such as the Internet, instead of over the existing Public Switched Telephone Network (PSTN). When the wireless Internet telephone is applied to an office, a user terminal provides the Internet telephone service to the user by accessing an IP-Private automatic Branch eXchange (IP-PBX) installed in the office. VoIP packets are transmitted and received over the Internet network by way of an Access Point (AP) under the control of the IP-PBX. Hence, the user can reconfirm past call conversations by recording the Internet telephone call to a separate recording server.

Most users possess a personal cellular phone. In this respect, usage of a dual-mode terminal combining the cellular telephone and the Internet telephone terminal is under consideration. The user uses the dual-mode terminal as the cellular phone outside the office and as the cellular phone and the Internet phone terminal within the office. Without having to separate the terminals for the cellular phone and the Internet phone, the user can enjoy both the cellular telephone service and the Internet telephone service via a single terminal.

As discussed above, using the dual-mode terminal, the Internet phone call can be recorded to the recording server. However, the cellular phone call of the dual-mode terminal can not be not recorded to the recording server. That is, when the function for automatically saving the Internet phone call to the recording server is required by the business, the cellular phone call is not saved to the recording server even though it is a business call. To efficiently utilize the call recording function, a solution for recording the cellular phone call to the recording server in the dual-mode terminal is needed.

SUMMARY OF THE INVENTION

An aspect of the present invention is to address at least the above mentioned problems and/or disadvantages and to provide at least the advantages described below. Accordingly, an aspect of the present invention is to provide an apparatus and a method for recording a cellular call of a dual-mode terminal to a recording server in an Internet telephone system.

Another aspect of the present invention is to provide an apparatus and a method for determining whether to record a cellular call of a dual-mode terminal in an Internet telephone system.

Yet another aspect of the present invention is to provide an apparatus and a method for preventing recording interruption of a cellular call when a dual-mode terminal leaves a recordable area in an Internet telephone system.

According to one aspect of the present invention, a dual-mode terminal in an Internet telephone system includes a call server interworker for, when a cellular call commences, determining whether it is possible to access a call server which controls Voice over Internet Protocol (VoIP) calls; a recording interface processor for, when it is possible to access the call server, setting a connection to a recording server; a recorder for generating recording data packets comprising a cellular phone conversation; and a data communicator for transmitting the recording data packets to the recording server.

According to another aspect of the present invention, a recording server in an Internet telephone system includes a processor for, when recording of a cellular call is requested from a dual-mode terminal having a cellular telephone function, setting a connection to the dual-mode terminal; and a recording DataBase (DB) for storing recording data packets which comprises a cellular phone conversation stored from the dual-mode terminal.

According to yet another aspect of the present invention, an operating method of a dual-mode terminal in an Internet telephone system includes when a cellular call commences, determining whether it is possible to access a call server which controls VoIP calls; when it is possible to access the call server, setting a connection to a recording server; generating recording data packets comprising a cellular phone conversation; and transmitting the recording data packets to the recording server.

According to still another aspect of the present invention, an operating method of a recording server in an Internet telephone system includes when recording of a cellular call is requested from a dual-mode terminal having a cellular telephone function, setting a connection to the dual-mode terminal; and storing recording data packets which comprises a cellular phone conversation stored from the dual-mode terminal.

BRIEF DESCRIPTION OF THE DRAWINGS

The above and other aspects, features and advantages of certain exemplary embodiments the present invention will become more apparent from the following detailed description taken in conjunction with the accompanying drawings, in which.

Throughout the drawings, like reference numerals will be understood to refer to like parts, components and structures.

DETAILED DESCRIPTION OF EMBODIMENTS
OF THE INVENTION

The following description with reference to the accompanying drawings is provided to assist in a comprehensive understanding of embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides a technique for recording a cellular phone call of a dual-mode terminal by a recording server in an Internet telephone system.

Figure 1:
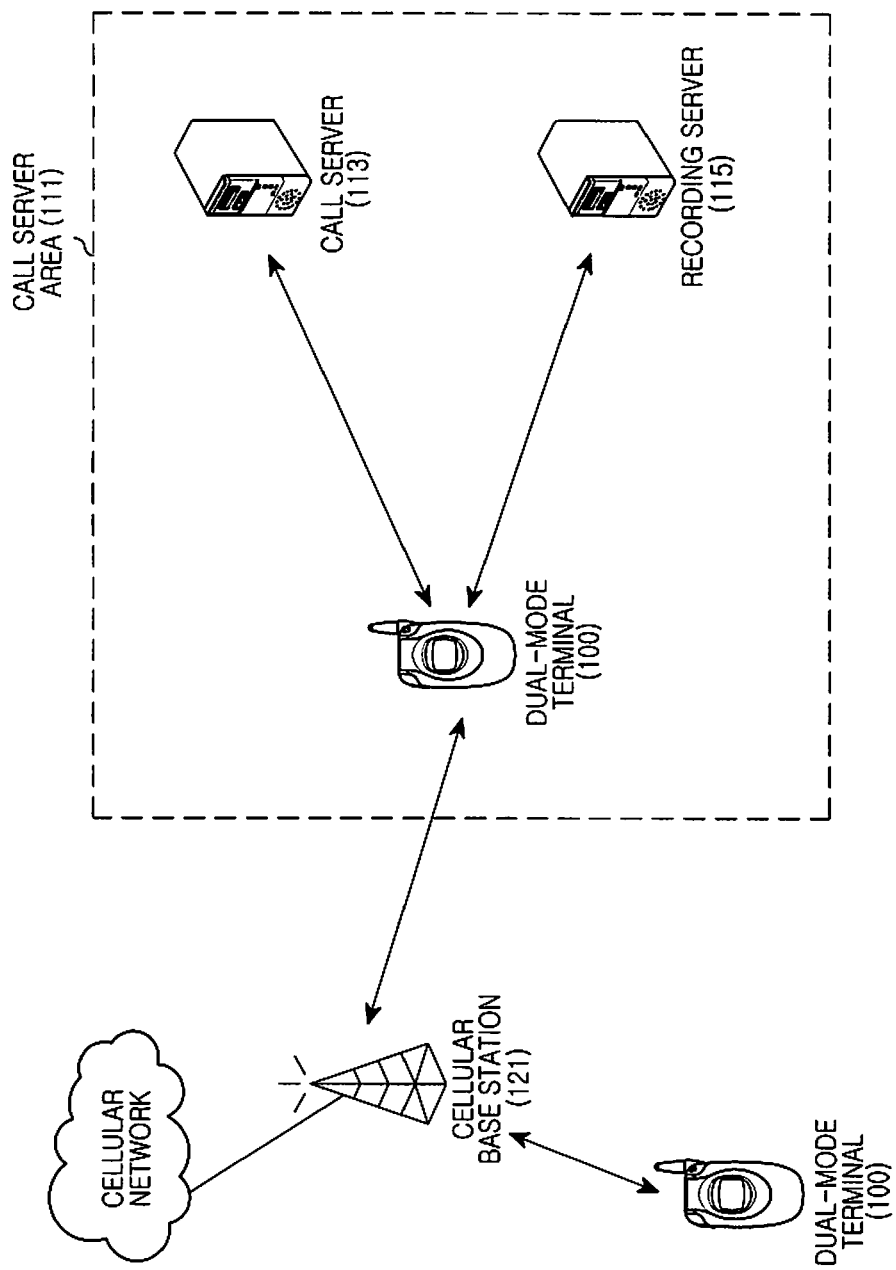
FIG. 1 illustrates a schematic diagram of a simplified operation range of a dual-mode terminal in an Internet telephone system according to an embodiment of the present invention.

FIG. 1 illustrates a schematic diagram of a simplified operation range of a dual-mode terminal in an Internet telephone system according to an embodiment of the present invention.

The dual-mode terminal 100 of FIG. 1 has a cellular call function and a Voice over Internet Protocol (VoIP) call function. For example, the dual-mode terminal 100 provides cellular calls in conformity with Code Division Multiple Access (CDMA) or Global System for Mobile communications (GSM) and VoIP calls in conformity with Worldwide Interoperability for Microwave Access (WiMAX) or Wireless Local Area Network (WLAN). The VoIP call is controlled by a call server 113 and is serviceable within a call server area 111. By contrast, the cellular call is serviceable in an area connectable to a cellular base station 121. The dual-mode terminal 100 can offer the VoIP call and the cellular call inside the call server area 111 and the cellular call outside the call server area 111. Herein, the call server area 111 indicates a geographical range connectable to the call server 113 and is determined by the coverage of a wireless Access Point (AP) connected to the call server 113.

The call server 113 controls the VoIP calls of the dual-mode terminal 100. For example, the call server 113 controls call setup, call connection, call termination, and so forth. More specifically, the call server 113 determines whether the dual-mode terminal 100 is a subscriber terminal controlled by the call server 113 during the VoIP call, and provides information required for the access to a recording server 115, for example, an IP address of the recording server 115. Notably, when the IP address of the recording server 115 is preset in the dual-mode terminal 100, the IP address is not provided. Herein, the call server 113 can be referred to as an IP-Private automatic Branch eXchange (IP-PBX).

The recording server 115 records the VoIP call or the cellular call when the dual-mode terminal 100 conducts the VoIP call or the cellular call within the call server area 111. Namely, the recording server 115 stores the cellular call recording data provided from the dual-mode terminal 100. The recording server 115 distinguishes and stores the VoIP call and the cellular call. Alternatively, in association with the call server 113, the recording server 115 stores the calls on a subscriber basis using discriminators (e.g., extension numbers) without distinguishing the VoIP call and the cellular call. The recording server 115 manages the stored call recording data by indexing with information such as transmission type, transmission length, authentication number, sender number, recipient number, extension number, packet order caller, and call duration.

The recording server 115 discriminates and stores the VoIP call and the cellular call and manages the stored call recording data by indexing them with information such as sender number, recipient number, caller, and call duration.

In this embodiment, the cellular call is recorded as follows. When the cellular call commences, the dual-mode terminal 100 determines whether it is located in the call server area 111. That is, the dual-mode terminal 100 determines whether it can access the call server 113. When the dual-mode terminal 100 travels within the call server area 111, it generates recording data packets including the cellular call conversation in real time and transmits the recording data packets to the recording server 115. The recording server 115 stores the recording data packets.

In so doing, the dual-mode terminal 100 needs to determine whether it is the subscriber of the call server 113. When a data communication module of the dual-mode terminal 100 is always active in the call server area 111, subscriber information verified when entering the call server area 111 is sustained. Accordingly, without separately determining whether it is the subscriber, the dual-mode terminal 100 transmits its recording data packets including the cellular call conversation immediately when initiating the cellular call. By contrast, when the data communication module of the dual-mode terminal 100 is inactivated, i.e. during a non-communication period, the dual-mode terminal 100 activates the data communication module when initiating the cellular call, determines whether it is the subscriber by interworking with the call server 113, and acquires information regarding access to the recording server 115. Next, the dual-mode terminal 100 transmits the recording data packets including the cellular call conversation. At this time, the dual-mode terminal 100 buffers the data packets including the cellular call conversation while determining whether it is the subscriber.

After the recording of the cellular call starts as above, the dual-mode terminal 100 may leave the call server area 111 because of movement of the user. In this situation, the dual-mode terminal 100 cannot transmit the recording data packets to the recording server 115. Hence, the dual-mode terminal 100 buffers the data packets including the cellular call conversation generated after the terminal leaves the call server area 111, and transmits the data packets to the recording server 115 when it re-enters the call server area 111. Based on its connection status to the AP, the dual-mode terminal 100 determines whether it has left the call server area 111. When the connection status gets hostile, the dual-mode terminal 100 buffers the data packets including the cellular call conversation generated after it has left the call server area 111, and transmits the data packets to the recording server 115 when the connection status recovers. For example, the connection status is determined by a channel quality value such as Signal to Noise Ratio (SNR) or Signal to Interference and Noise Ratio (SINR), or by ACKnowledge/Non-ACK (HACK) feedback frequency based on an Automatic Repeat reQuest (ARQ) scheme.

Now, structures and operations of the dual-mode terminal and the recording server for recording the phone conversation will be described in detail below with reference to the drawings.

Figure 2:
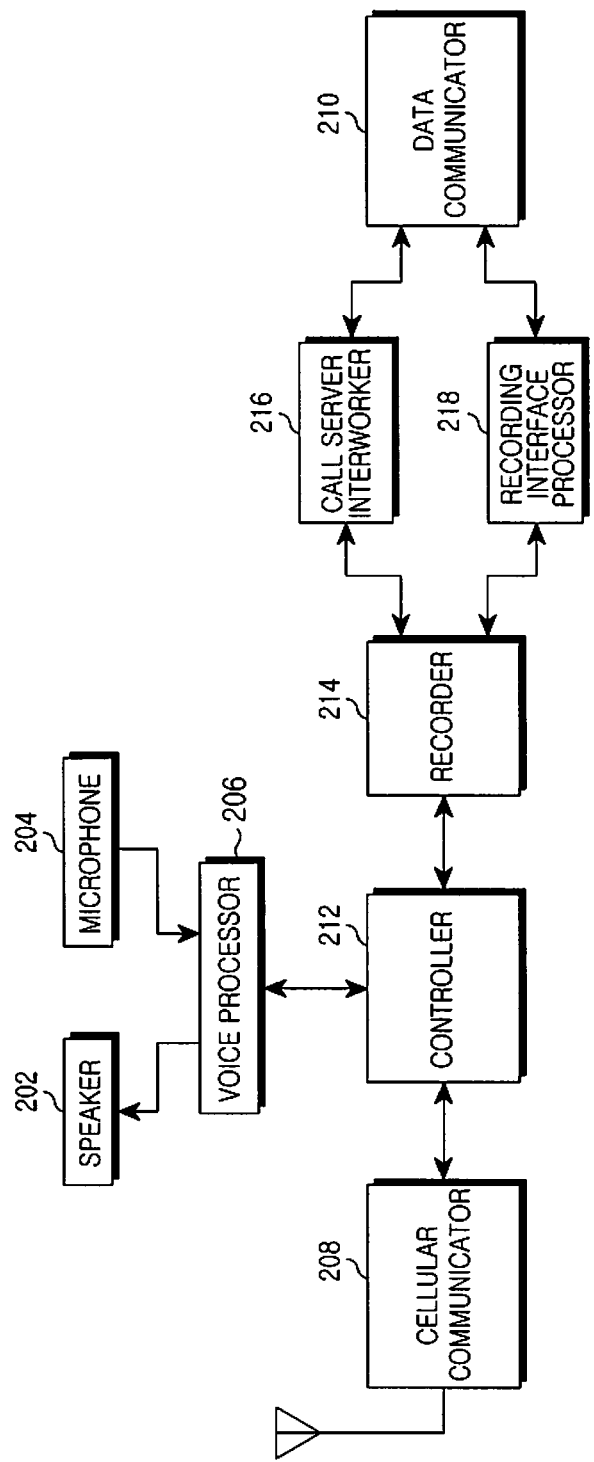
FIG. 2 illustrates a block diagram of the dual-mode terminal in the Internet telephone system according to an embodiment of the present invention.

FIG. 2 is a block diagram of the dual-mode terminal in the Internet telephone system according to an embodiment of the present invention.

The dual-mode terminal of FIG. 2 includes a speaker 202, a microphone 204, a voice processor 206, a cellular communicator 208, a data communicator 210, a controller 212, a recorder 214, a call server interworker 216, and a recording interface processor 218.

The speaker 202, which is a voice output device, converts an electric voice signal output from the voice processor 206 to a physical voice signal audible by the user. The microphone 204 converts the user's voice to an electric signal and outputs the electric signal to the voice processor 206. The voice processor 206 decodes voice data output from the controller 212 to an electric voice signal and outputs the electric voice signal to the speaker 202, and encodes the electric voice signal output from the microphone 204 to voice data.

The cellular communicator 208 takes charge of the conversion between the physical signal and the data bit stream in conformity with the standard of the cellular communication system. For example, the cellular communicator 208 carries out the conversion function between the physical signal and the data bit stream in conformity with the CDMA scheme or the GSM scheme. That is, according to the CDMA scheme, the cellular communicator 208 Pseudo Noise (PN)-spreads the transmit data and PN-despreads the received signal.

The data communicator 210 takes charge of the conversion between the physical signal and the data bit stream in conformity with the standard of the data communication system. For example, the data communicator 210 conducts the conversion function between the physical signal and the data bit stream in conformity with the Orthogonal Frequency Division Multiplexing (OFDM)/Orthogonal Frequency Division Multiple Access (OFDMA) scheme. According to the OFDM/OFDMA scheme, the data communicator 210 applies an Inverse Fast Fourier Transform (IFFT) operation and Cyclic Prefix (CP) insertion to the transmit data and CP elimination and an FFT operation to the received signal.

The controller 212 controls the functions of the dual-mode terminal. More specifically, the controller 212 determines the function corresponding to a command input through a user's manipulation, the internal status of the dual-mode terminal, and information received through the cellular communicator 208 and the data communicator 210, and controls the operations of the blocks required to execute the function. When the cellular call commences, the controller 212 triggers the operation of the recorder 214 to record the cellular call to the recording server.

The recorder 214 functions to record the cellular call to the recording server. The recorder 214 generates the recording data packets including the cellular phone conversation and buffers the recording data packets. The call server interworker 216 functions to perform a preset process of the recording of the cellular call. For example, the call server interworker 216 functions to determine whether it is possible to access the call server and to determine whether the dual-mode terminal is the subscriber. The recording interface processor 218 functions to send the recording data packets including the cellular phone conversation to the recording server.

Figure 3:
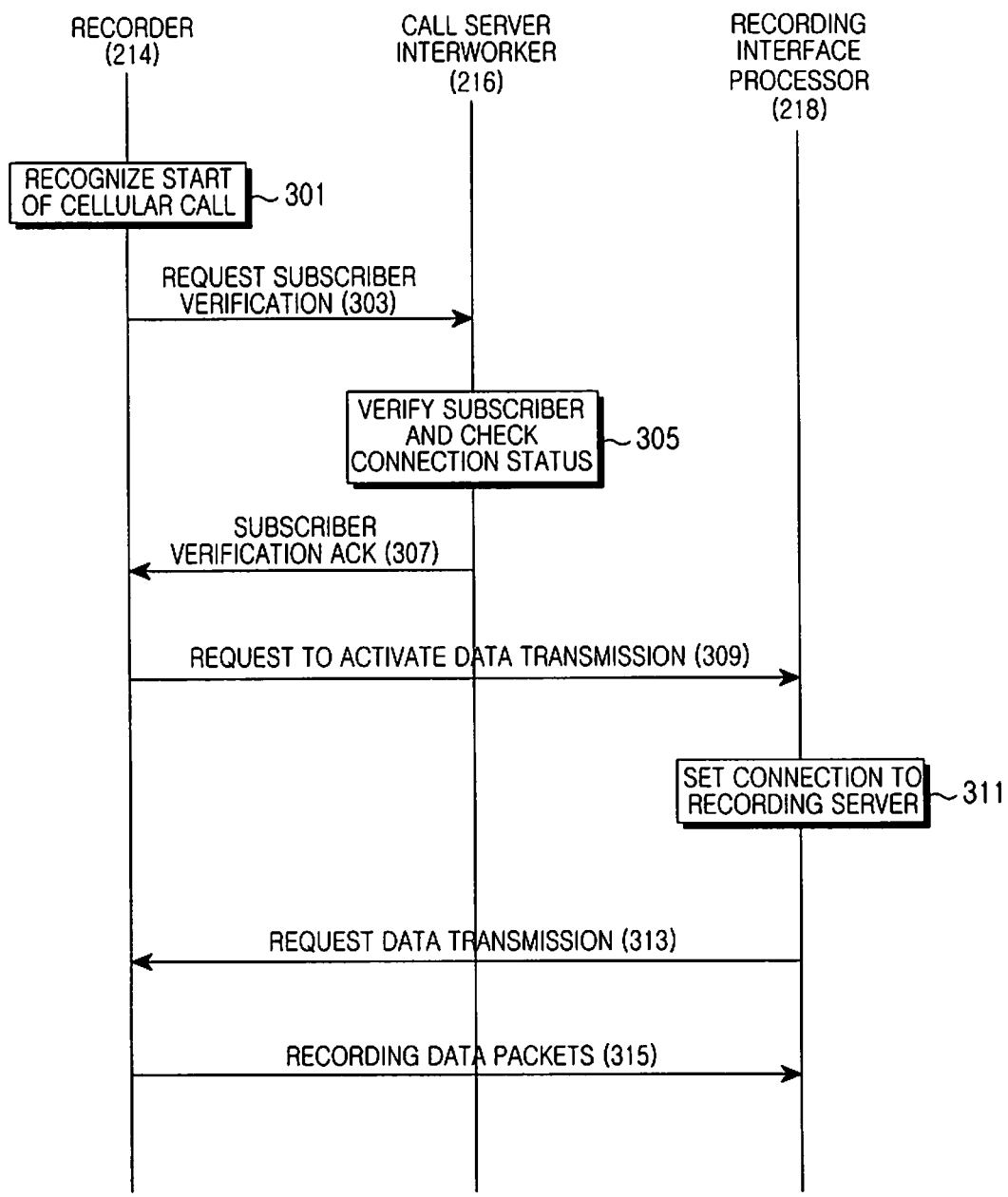
FIG. 3 illustrates a flow diagram of an interworking process between the blocks of the dual-mode terminal in the Internet telephone system according to an embodiment of the present invention.

The operations of the recorder 214, the call server interworker 216, and the recording interface processor 218 are illustrated in FIG. 3. The recorder 214 recognizes the start of the cellular call under the control of the controller 212 in step 301. The recorder 214 requests the call server interworker 216 to verify the subscriber to record the cellular call in step 303. The call server interworker 216 receiving the request for the subscriber verification activates the data communicator 210, determines whether it is possible to connect to the call server by attempting the access to the data network, and determines whether the dual-mode terminal is the subscriber of the call server when the connection is feasible in step 305. If the data communicator 210 has already finished the subscriber verification of the call server, the subscriber verification will be omitted. Upon confirming the connectivity and the subscriber at the same time, the call server interworker 216 informs the recorder 214 that the recording is possible in step 307. Hence, the recorder 214 requests the recording interface processor 218 to activate the data transmission in step 309. The recording interface processor 218 receiving the request of the data transmission activation performs authentication by accessing the recording server through the data communicator 210 and establishes the connection to the recording server in step 311. Next, the recording interface processor 218 requests the recorder 214 to provide the recording data packets including the cellular phone conversation in step 313. The recorder 214 provides the recording data packets to the recording interface processor 218 in step 315. The recording interface processor 218 transmits the recording data packets to the recording server via the data communicator 210.

After the recording starts as illustrated in FIG. 3, the recorder 214 constantly monitors the radio link connection status to the AP of the data network under the control of the controller 212. When the connection status gets worse, the recorder 214 buffers the generated recording data packets. When the connection status recovers, the recorder 214 provides the recording data packets to the recording interface processor 218. For example, the recorder 214 determines the connection status based on a channel quality value such as SNR, SINR, and Carrier Interference to Noise Ratio (CINR), or based on the ACK/NACK feedback frequency according to the ARQ scheme. That is, the recorder 214 calculates a connection status index based on the channel quality value or the ACK/NACK feedback frequency, and determines that a poor connection status exists when the connection status index is less than a threshold.

Figure 4:
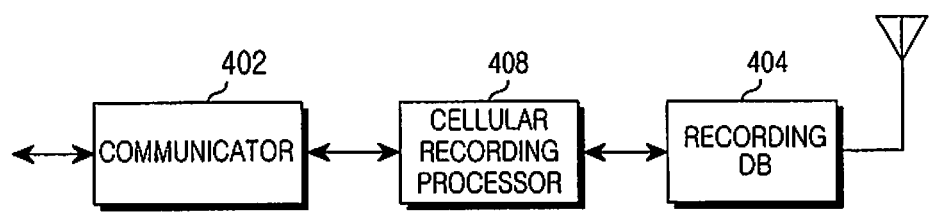
FIG. 4 illustrates a block diagram of a recording server in the Internet telephone system according to an embodiment of the present invention.

FIG. 4 is a block diagram of the recording server in the Internet telephone system according to an embodiment of the present invention.

The recording server of FIG. 4 includes a communicator 402, a recording DataBase (DB) 404, and a cellular recording processor 406.

The communicator 402 provides the interface for communication in the data network. The recording DB 404 stores the recording data including the phone conversations of the terminal. The recording DB 404 stores the recording data by data-packetizing the cellular voice signals and manages the recording data of the stored phone conversations by indexing them with information such as transmission type, transmission length, authentication number, sender number, recipient number, extension number, and the packet order.

The cellular recording processor 406 packetizes the voice data so that the recording server can recognize the cellular phone conversation, and performs a process for receiving the cellular call recording data from the terminal according to a preset protocol. In more detail, the cellular recording processor 406 recognizes a control message requesting to record the cellular phone call, which is received from the terminal, and sets up the connection to the terminal. After the connection setup, the cellular recording processor 406 provides the recording data packets received from the terminal to the recording DB 404.

Figure 5:
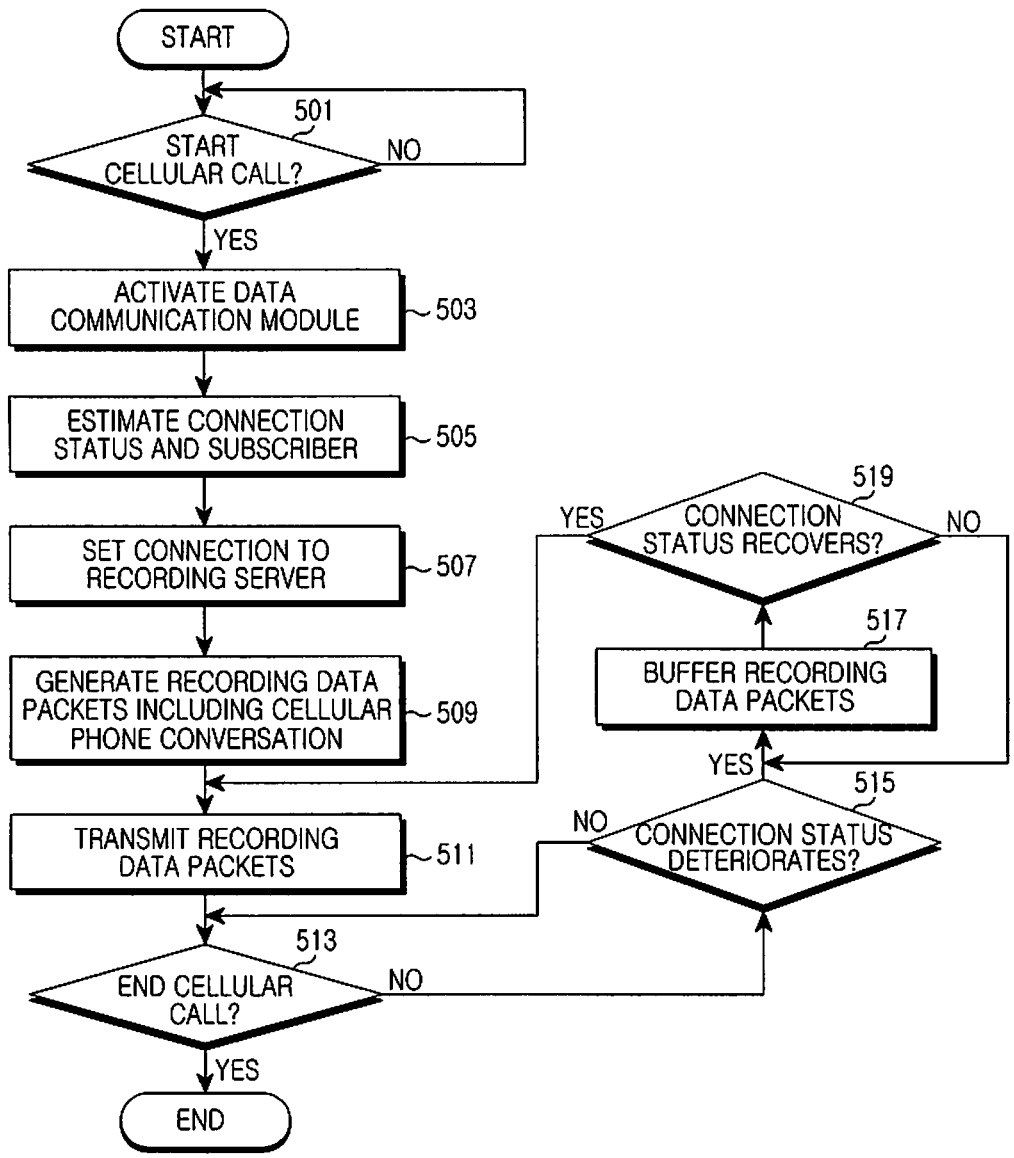
FIG. 5 illustrates a flow chart of operations of the dual-mode terminal in the Internet telephone system according to an embodiment of the present invention.

FIG. 5 illustrates a flowchart of the operations of the dual-mode terminal in the Internet telephone system according to an embodiment of the present invention.

In step 501, the dual-mode terminal determines whether the cellular call commences. That is, the dual-mode terminal determines whether the call is received over the cellular network or the call is transmitted over the cellular network.

When the cellular call starts, the dual-mode terminal activates the data communication module in step 503. In more detail, the data communication module is deactivated when communication is not conducted for a certain time duration, and the dual-mode terminal activates the data communication module to record the cellular call. When the data communication module is already activated or is not deactivated during a period of non-communication, step 503 is omitted.

In step 505, the dual-mode terminal estimates the connection status and the subscriber. The dual-mode terminal determines whether it is possible to connect the call server by attempting access to the data network, and if possible, determines whether it is the subscriber of the call server.

In step 507, the dual-mode terminal establishes the connection to the recording server. The dual-mode terminal sets the connection to the recording server by requesting the recording server to record the cellular call and receiving the request to send the recording data packets from the recording server. That is, the dual-mode terminal builds a data transmission and reception path to the recording server.

In step 509, the dual-mode terminal generates the recording data packets including the cellular phone conversation. At this time, as the cellular call proceeds, the dual-mode terminal constantly generates the recording data packets.

In step 511, the dual-mode terminal transmits the recording data packets to the recording server. The dual-mode terminal transmits the recording data packets generated just before the transmission, or the buffered recording data packets.

In step 513, the dual-mode terminal determines whether the cellular call ends. When the cellular call ends, the dual-mode terminal finishes this process.

By contrast, when the cellular call does not end, the dual-mode terminal determines whether the connection status has deteriorated in step 515. More specifically, the dual-mode terminal determines whether the radio link connection status to the AP of the data network for access to the recording server has deteriorated. For example, the dual-mode terminal determines the connection status based on the channel quality value such as SNR, SINR, and CINR, or based on a ACK/NACK feedback frequency according to the ARQ scheme. In other words, the dual-mode terminal calculates the connection status index based on the channel quality value or the ACK/NACK feedback frequency, and determines the worse connection status when the connection status index is less than the threshold.

When the connection status gets worse, the dual-mode terminal buffers the generated recording data packets in step 517. The dual-mode terminal stops the transmission of the recording data packets according to the connection status deterioration, and buffers the generated recording data packets.

In step 519, the dual-mode terminal determines whether the connection has status recovered. In more detail, the dual-mode terminal determines whether the radio link connection status to the AP of the data network for access to the recording server gets better enough to transmit the recording data packets. That is, the dual-mode terminal determines whether the connection status index is greater than or equal to the threshold, and if so, returns to step 511. When the connection status does not recover, the dual-mode terminal returns to step 517.

When the connection status recovers, the dual-mode terminal goes back to step 511 and sends the buffered recording data packets to the recording server.

Figure 6:
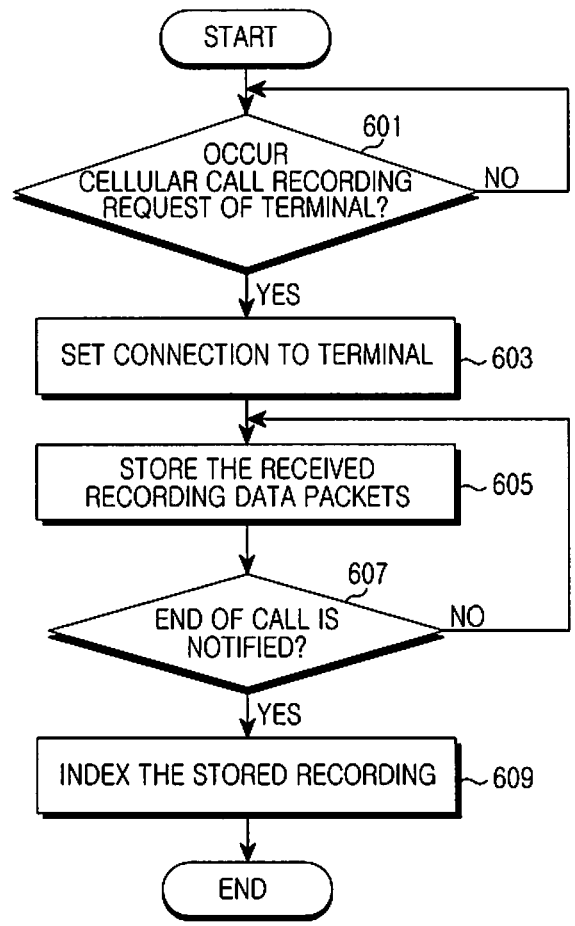
FIG. 6 illustrates a flow chart of operations of the recording server in the Internet telephone system according to an embodiment of the present invention.

FIG. 6 illustrates a flowchart of the operations of the recording server in the Internet telephone system according to an embodiment of the present invention.

In step 601, the recording server determines whether or not the recording request of the cellular call of the terminal occurs. That is, the recording server determines whether the control message requesting to record the cellular call is received from the terminal.

When the recording request of the cellular call occurs, the recording server sets the connection to the terminal in step 603. That is, the recording server builds the data transmission and reception path to the terminal. Next, the recording server stores the recording data packets including the cellular phone conversation received from the terminal in step 605.

In step 607, the recording server determines whether notification of the end of the cellular call is received from the terminal. That is, the recording server determines whether notification of the end of the transmission of the recording data packets is received from the terminal. When the notification of the end of the cellular call is not received the recording server goes back to step 605.

When the notification of the end of the cellular call is received, the recording server indexes the recording data of the cellular phone conversation with information such as transmission type, the transmission length, authentication number, sender number, recipient number, extension number, packet order, and call duration. For example, the discriminators of the transmission type can include recording authentication request, positive response (ACK), negative response (NACK), information delivery, and communication end. The transmission length represents the length of the voice data packets. The authentication number is assigned in the initial authentication process of the recording server, and the packet number indicates the order of the corresponding packet. By use of this information, delivery of the cellular call recording packets between the terminal and the recording server can be guaranteed.

By recording not only the VoIP call but also the cellular call of the dual-mode terminal within the VoIP call service area to the recording server in the Internet telephone system, the utilization of the call recording function using the recording server can be enhanced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a terminal supporting multi radio access technologies (multi RATs) in a wireless communication system, the method comprising:

establishing a cellular call through a first RAT via a base station;

transmitting, to a call server that controls a connection of a recording server, a subscriber confirmation request message through a second RAT;

receiving, from the call server, a subscriber confirmation message and access information through the second RAT;

establishing the connection with the recording server through the second RAT using the received access information;

transmitting, to the recording server through the second RAT via an access point (AP), a request to record the cellular call through the first RAT;

receiving, from the recording server through the second RAT via the AP, a request to transmit data packets including voice data of the cellular call;

calculating a connection status index based on a channel quality between the recording server and the terminal;

if the calculated connection status index is less than a threshold, buffering the data packets in the terminal; and if the calculated connection status index is equal to the threshold or greater than the threshold, transmitting the data packets to the recording server.

2. The method of claim 1, further comprising:

determining whether the cellular call through the first RAT is ended; and transmitting, to the recording server through the second RAT via the AP, a notification of end of the cellular call through the first RAT when the cellular call through the first RAT is determined to be ended.

3. The method of claim 1, wherein the channel quality is at least one of signal to noise ratio (SNR), signal to interference and noise ratio (SINR), carrier to interference and noise ratio (CINR) and acknowledge (ACK)/non-ack (NACK) feedback frequency.

4. A method for operating a recording server in a wireless communication system, the method comprising:

establishing a connection with a terminal, wherein the establishing the connection with the terminal is performed based on access information transmitted to the terminal from a call server controlling a connection of the recording server when the call server confirms that the terminal is a subscriber of the call server;

receiving, from the terminal through a second RAT via an access point (AP), a request to record a cellular call established through a first RAT;

transmitting, to the terminal through the second RAT via the AP, a request to transmit data packets including voice data of the call through the first RAT;

if a calculated connection status index based on a channel quality, is equal to a threshold or greater than the threshold, receiving, from the terminal through the second RAT via the AP, the data packets including the voice data of the cellular call to be recorded through the first RAT, wherein the cellular call is established through the first RAT via a base station; and storing the received data packets, wherein the data packets are buffered in the terminal if the calculated connection status index is less than the threshold.

5. The method of claim 4, further comprising:

determining whether a notification of end of the cellular call through the first RAT occurs from the terminal through the second RAT via the AP; and when the notification is determined to have occurred, indexing the received data packets with information on at least one of transmission type, transmission length, authentication number, sender number, recipient number, extension number, packet order and call duration.

6. The method of claim 4, wherein the channel quality is at least one of signal to noise ratio (SNR), signal to interference and noise ratio (SINR), carrier to interference and noise ratio (CINR) and acknowledge (ACK)/non-ack (NACK) feedback frequency.

7. An apparatus of a terminal supporting multi radio access technologies (multi RATs) in a wireless communication system, the apparatus comprising:

a recorder;

a first transceiver supporting a first RAT;

a second transceiver supporting a second RAT; and at least one processor, wherein the at least one processor is configured to:

control the first transceiver to establish a cellular call through the first RAT via a base station;

control the second transceiver to transmit, to a call server that controls a connection of the recording server, a subscriber confirmation request message through the second RAT;

control the second transceiver to receive, from the call server, a subscriber confirmation message and access information through the second RAT;

control the second transceiver to establish the connection with the recording server through the second RAT using the received access information;

control the second transceiver to transmit, to the recording server through the second RAT via an access point (AP), a request to record the cellular call through the first RAT;

control the second transceiver to receive, from the recording server through the second RAT via the AP, a request to transmit data packets including voice data of the cellular call;

control to calculate a connection status index based on a channel quality between the recording server and the terminal if the calculated connection status index is less than a threshold, control to buffer the data packets in the terminal; and if the calculated connection status index is equal to the threshold or greater than the threshold, control to transmit the data packets to the recording server.

8. The apparatus of claim 7, wherein the at least one processor is further configured to:

determine whether the cellular call through the first RAT is ended; and transmit, to the recording server through the second RAT via the AP, a notification of end of the cellular call through the first RAT when the cellular call through the first RAT is determined to be ended.

9. The apparatus of claim 7, wherein the channel quality is at least one of signal to noise ratio (SNR), signal to interference and noise ratio (SINR), carrier to interference and noise ratio (CINR) and acknowledge (ACK)/non-ack (NACK) feedback frequency.

10. An apparatus of a recording server in a wireless communication system, the apparatus comprising:

a transceiver supporting a second interface;

a database; and at least one processor, wherein the at least one processor is configured to:
control the transceiver to establish a connection with the terminal based on access information transmitted to the terminal from a call server controlling a connection of the recording server when the call server confirms that the terminal is a subscriber of the call server;
control the transceiver to receive, from the terminal through a second RAT via an access point (AP), a request to record a cellular call established through a first RAT;
transmit, to the terminal through the second RAT via the AP, a request to transmit data packets including voice data of the cellular call through the first RAT;
if a calculated connection status index based on a channel quality is equal to a threshold or greater than the threshold, control the transceiver to receive, from the terminal through the second RAT via the AP, the data packets including the voice data of the cellular call to be recorded through the first RAT, wherein the cellular call is established through the first RAT via a base station; and
store the received data packets,
wherein the data packets are buffered in the terminal if the calculated connection status index is less than the threshold.

11. The apparatus of claim 10,
wherein the at least one processor is further configured to:
determine whether a notification of end of the cellular call through the first RAT occurs from the terminal through the second RAT via the AP; and
when the notification is determined to have occurred, index the received data packets with information on at least one of transmission type, transmission length, authentication number, sender number, recipient number, extension number, packet order and call duration.

12. The apparatus of claim 10,
wherein the channel quality is at least one of signal to noise ratio (SNR), signal to interference and noise ratio (SINR), carrier to interference and noise ratio (CINR) and acknowledge (ACK)/non-ack (NACK) feedback frequency.

* * * * *